AUTOMATIC PHONOGRAPH RECORDING SELECTOR MEANS

Filed June 27, 1960 5 Sheets-Sheet 1

INVENTORS
Robert S. Tuttle
Charles A. Mellon
BY: Olson & Trexler
attys.

AUTOMATIC PHONOGRAPH RECORDING SELECTOR MEANS

Filed June 27, 1960 5 Sheets-Sheet 2

INVENTORS
Robert S. Tuttle
Charles A. Mellon
BY: Olson & Trexler
attys.

AUTOMATIC PHONOGRAPH RECORDING SELECTOR MEANS

INVENTOR.
Robert S. Tuttle
BY; Charles A. Mellon
Olson & Trexler attys.

AUTOMATIC PHONOGRAPH RECORDING SELECTOR MEANS

Filed June 27, 1960 5 Sheets-Sheet 4

INVENTORS
Robert S. Tuttle
BY Charles A. Mellon
Olson & Trexler attys.

AUTOMATIC PHONOGRAPH RECORDING SELECTOR MEANS

Filed June 27, 1960 5 Sheets-Sheet 5

INVENTORS
Robert S. Tuttle
BY: Charles A. Melton
Olson & Trexler attys.

3,093,378

AUTOMATIC PHONOGRAPH RECORDING SELECTOR MEANS

Robert S. Tuttle, Eggertsville, and Charles A. Mellon, Clarence, N.Y., assignors to The Wurlitzer Company, Chicago, Ill., a corporation of Ohio Filed June 27, 1960, Ser. No. 38,861
10 Claims. (Cl. 274—10)

The present invention relates to coin controlled automatic phonographs and is concerned more specifically with means for selecting records for playing in such phonographs.

One object of the invention is to provide an automatic phonograph having new and improved means for setting a large number of selector elements selectively by operation of a much smaller number of selector element setting solenoids.

Another object is to provide an automatic phonograph in which new and improved record selection means utilizes only a small number of solenoids of low power to produce a highly efficient mode of operation which effects a high order of multiplication of the number of record selector elements that can be set selectively by a given number of setting solenoids.

Another object is to provide an automatic phonograph having new and improved record selecting means which markedly reduces the energy required to shift selector structure selectively to any one of a large number of differentially spaced positions, thereby providing for quick shifting of the selector structure to selected positions by solenoids of relatively low power.

Another object is to provide, in a coin controlled automatic phonograph which plays records automatically in accordance with the setting of selector elements, new and improved selector element setting structure which is located in a normal position by control means which provides at once for adjustment of the normal position of the setting structure and for quick displacement of the setting structure to differentially spaced selector positions located on opposite sides of the normal position of the setting structure.

Another object is to provide in an automatic phonograph, as recited in the previous objects, remotely controlled selector operating structure which can be optionally integrated structurally with the selector control structure of the phonograph in a new and improved manner which provides a high order of over-all compactness of the integrated assembly, together with a functionally coacting relationship of the parts and a ready accessibility to all the components for servicing.

Another object is to provide a new and improved automatic phonograph, as recited in the preceding objects, in which the features and advantages recited in the preceding objects are achieved by an inherently economical construction which is extremely efficient and reliable in use.

Other objects and advantages will become apparent from the following description of the exemplary embodiment of the invention illustrated in the drawings, in which.

Figures 1, 2, 3, 18:
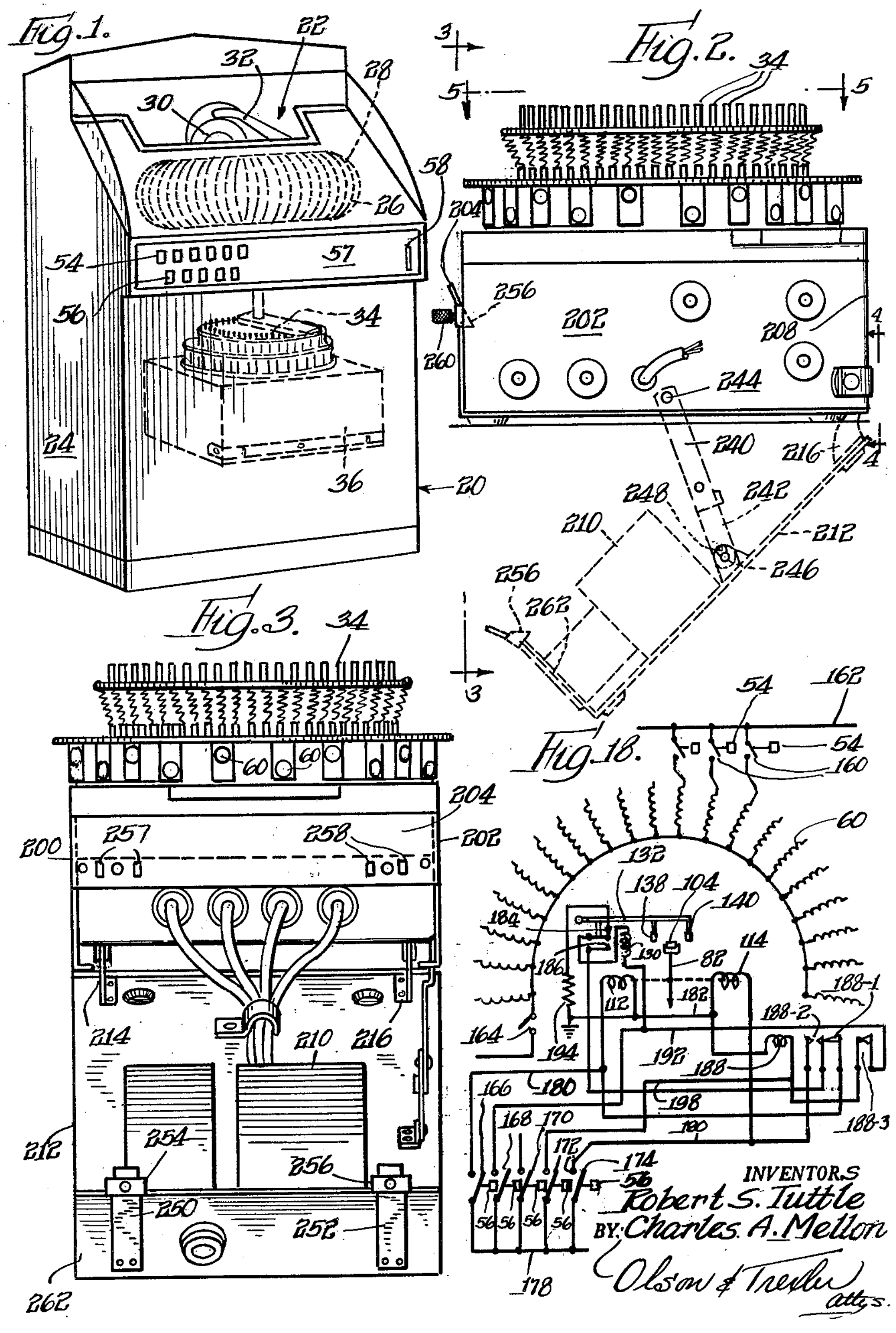
FIGURE 1 is a perspective view of the coin controlled automatic phonograph forming the exemplary embodiments of the invention to be described, certain internal components being illustrated in phantom.
FIG. 2 is an enlarged side view of selector element setting structure, illustrating the mounting of remotely controlled operating structure and illustrating in phantom the open position of the assembly which provides access to internal components.
FIG. 3 is a vertical elevational view taken with reference to the line 3—3 of FIG. 2 and illustrating the open position of the assembly.
FIG. 18 is a simplified diagrammatic illustration of electrical control circuits used in operating the selector structure.
Figure 5:
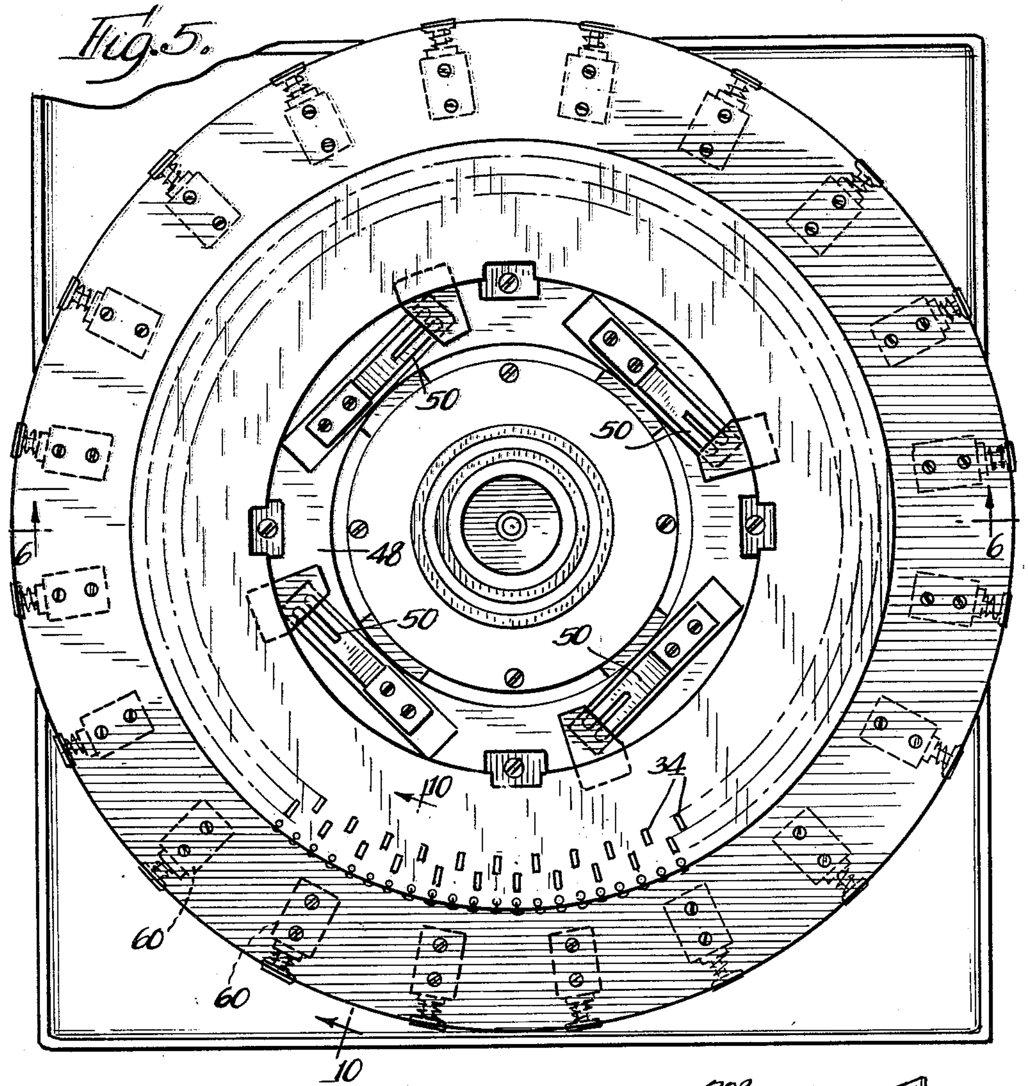
FIG. 5 is an enlarged horizontal plan view taken with reference to the line 5—5 of FIG. 2.

Referring to the drawings in greater detail, a coin controlled automatic phonograph forming the exemplary embodiment of the invention is identified in FIG. 1 by the number 20. Conventional automatic record playing mechanism 22 housed within the casing 24 of the phonograph 20 operates in a well known manner to transfer individual records 26 from a toroidal magazine 28 to a turntable 30 where the records are played by a tone arm 32 and subsequently returned to the magazine 28. The records in the magazine 28 are automatically played selectively in a manner in accordance with the selective setting of a plurality of selector pins 34 corresponding in number to the playing sides on all the records 26 and arranged in an annular array on a selector assembly 36, as illustrated in FIGS. 1, 3 and 5. In this instance, the magazine 28 is designed to hold fifty records and one hundred settable selector pins 34 corresponding to the one hundred record sides available for playing.

Figure 6:
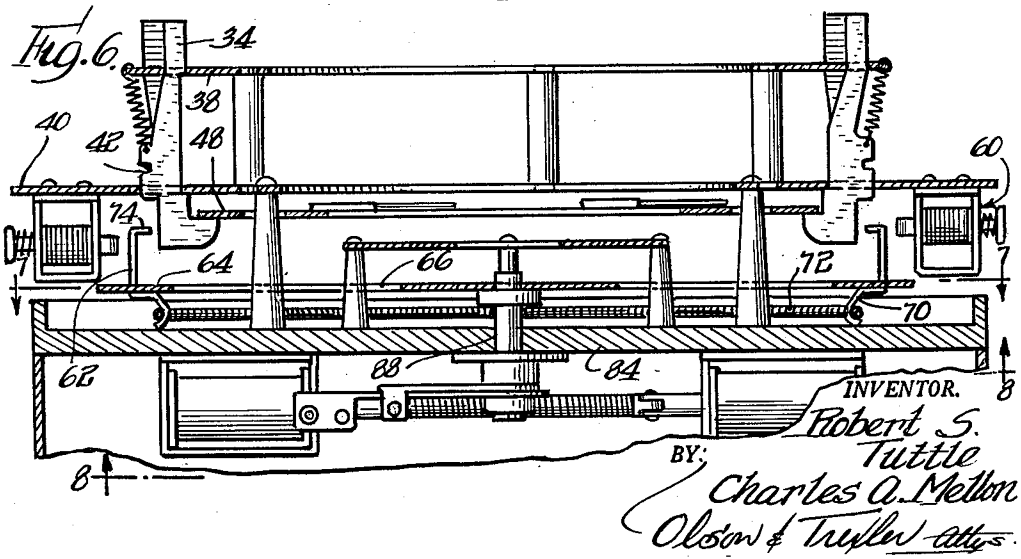
FIG. 6 is a fragmentary, vertical sectional view taken with reference to the line 6—6 of FIG. 5.
Figures 10, 11, 12, 13, 14, 15, 16, 17:
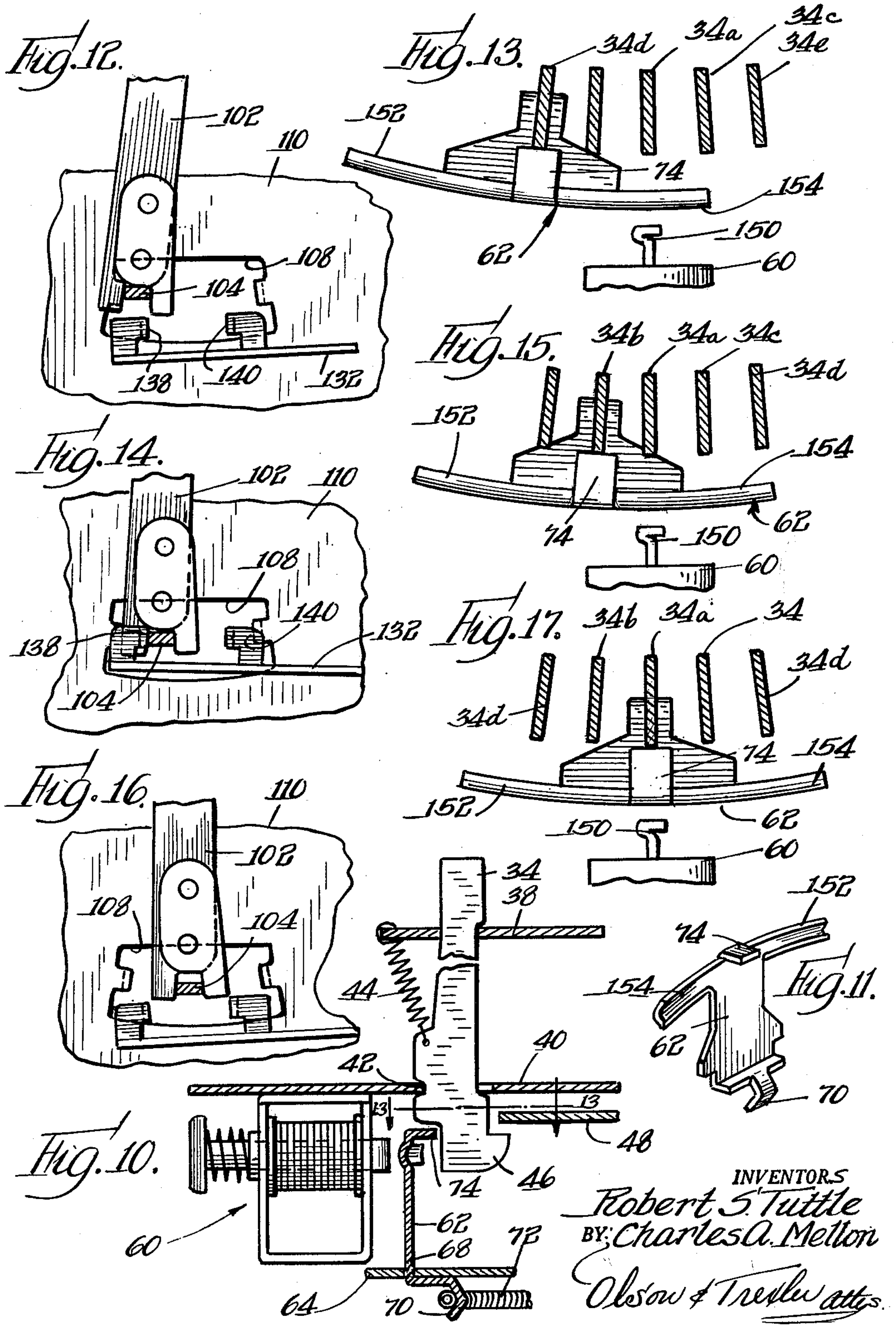
FIG. 10 is an enlarged, fragmentary sectional view taken with reference to the line 10—10 of FIG. 5, and showing the operative relationship of a pin setting solenoid to a selector pin.
FIG. 11 is a perspective view of a rocker element used to transmit motion from a pin setting solenoid to a selector pin.
FIG. 12 is a fragmentary sectional view taken with reference to the line 12—12 of FIG. 9, and showing the positions of the parts when the rotary pin setting structure is shifted to one extreme position.
FIG. 13 is a fragmentary sectional view taken with reference to the line 13—13 of FIG. 10, and showing the position of a pivotal rocker in relation to a coacting pin and an actuating solenoid when the rotary selector structure is in the position corresponding to the position of the parts in FIG. 12.
FIG. 14 is a view similar to FIG. 12 but illustrating the position of the parts when the selector structure is shifted to an intermediate selecting position.
FIG. 15 is a view similar to FIG. 13 but illustrating the position of the parts for the condition illustrated in FIG. 14.
FIG. 16 is a view similar to FIG. 12 but illustrating the relationship of the parts when the selecting structure is in its middle position.
FIG. 17 is similar to FIG. 13 but corresponds to the positional relationship illustrated in FIG. 16.

As illustrated in FIGS. 6 and 10, the pins 34 are guided in an upper annular plate 38 and a lower annular plate 40 for vertical movement between normal positions, illustrated in FIG. 10, and raised or "set" positions, illustrated in FIG. 6. Each pin 34 is latched in its lower, normal position by engagement of a notch 42 in the pin with the plate 40, as shown in FIG. 10, and is biased toward a set position by a tension spring 44.

Setting of each pin is effected by moving the lower end of the pin radially inward to release the notch 42 from the plate 40, whereupon the pin is moved upwardly by the spring 44, engaging a toe 46 on the pin with a switch operating ring 48 to close one of a plurality of switches 50, FIG. 5, to effect playing of record selections corresponding to the set pin or pins 34.

Selective setting of the one hundred selector pins 34 is controlled by a bank of number buttons 54 and a bank of letter buttons 56 on a control panel 57 on the front of the phonograph housing 24, FIG. 1. Each record in the magazine 28 is identified by a corresponding number and letter. To effect selection of a desired recording after depositing money in a coin slot 58, the customer punches a number button and a letter button corresponding to the desired selection.

The one hundred selector pins 34 are set selectively by the selective energization of an annular series of twenty pin setting solenoids 60 secured to the underside of the annular pin guide plate 40, as shown in FIGS. 5, 6 and 10. Each solenoid 60 is located radially outward of the array of pins 34 and is used to effect a selective setting of different adjacent pins 34 under the control of the selector buttons 54, 56.

New and improved selecting means operated under the control of the letter buttons 56 are provided for effecting an operative pin setting relationship of the stationary solenoids 60 with any one of five different series of the selector pins 34, each series of pins comprising twenty circumferentially spaced pins. It will be understood that all five series of the pins 34 are all arranged in the common annular array previously mentioned.

Figure 7:
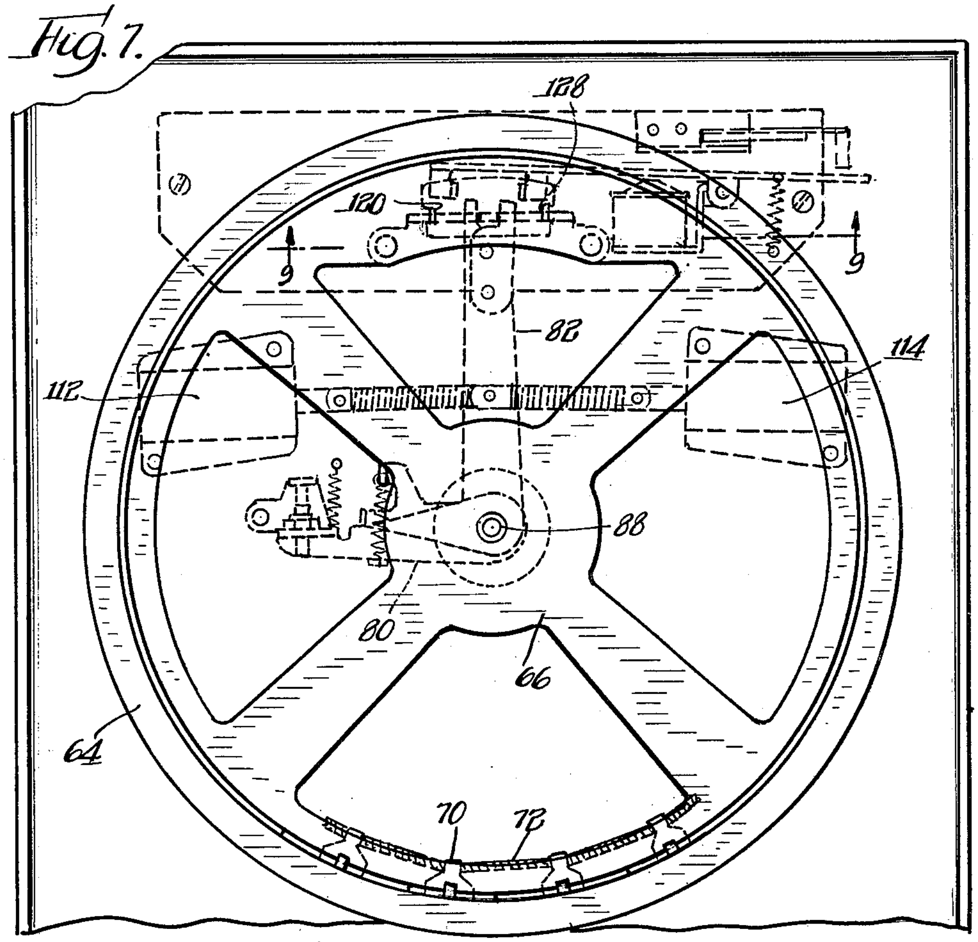
FIG. 7 is a horizontal sectional view taken along the line 7—7 of FIG. 6.

For this purpose, twenty solenoid transmission elements or rockers 62 corresponding to the respective solenoids 60 are pivotally supported in circumferentially spaced relation to each other on a lightweight, annular carrier disk 64 supported by a spider 66 for rotation in concentric relation to the annular array of pins 34. As shown in FIGS. 6, 7 and 10, the carrier 64 is located at a level just below the solenoids 60.

The individual rockers 62 are mounted in circumferentially spaced slots 68 in the carrier 64 and have hook elements 70 below the carrier 64, which are urged radially inward by a common annular spring 72. This holds the upper ends of the rockers 62 which project above the carrier 64 radially outward from the lower ends of the pins 34.

The upper end of each rocker 62 defines a central pin engaging tab 74 which projects radially inward toward the adjacent pin 34.

The carrier 64 is rotatable to five differentially spaced operating positions corresponding to five different series of selector pins 34 of twenty pins each. Selective location of the ring or carrier 64 in its five selecting positions brings the pin setting tab 74 of each rocker 62 into opposed selective alinement with five adjacent ones of the pins 34. Alinement of the tabs 74 with the pins 34 will be described presently in greater detail.

The carrier 64 is normally located in the middle or central one of its five rotatably spaced selecting positions by centering means which provides at once for adjustment of the middle selecting position of the carrier and for rotary shifting movement of the carrier in opposite directions away from its central selecting position to other selecting positions located on opposite sides of the middle position.

This is accomplished by means of two coacting centering arms 80, 82 located in underlying relation to a support plate 84 below the carrier 64 and journaled for swinging movement about a common pivot 88 concentric with the annular array of pins 34. As viewed from the underside, the arm 80 is biased rotatably in a counterclockwise direction by a tension spring 90 to engage an adjustable stop 92 on the free end of the arm with a depending abutment 94, which determines the normal position of the arm 80. The position of the arm 80 when the abutment 92 engages the stop 94 corresponds to and determines the central selecting position of the carrier 64. It will be observed with reference to FIG. 8 that the arm 80 can swing in only one direction from its normal position.

Figure 8:
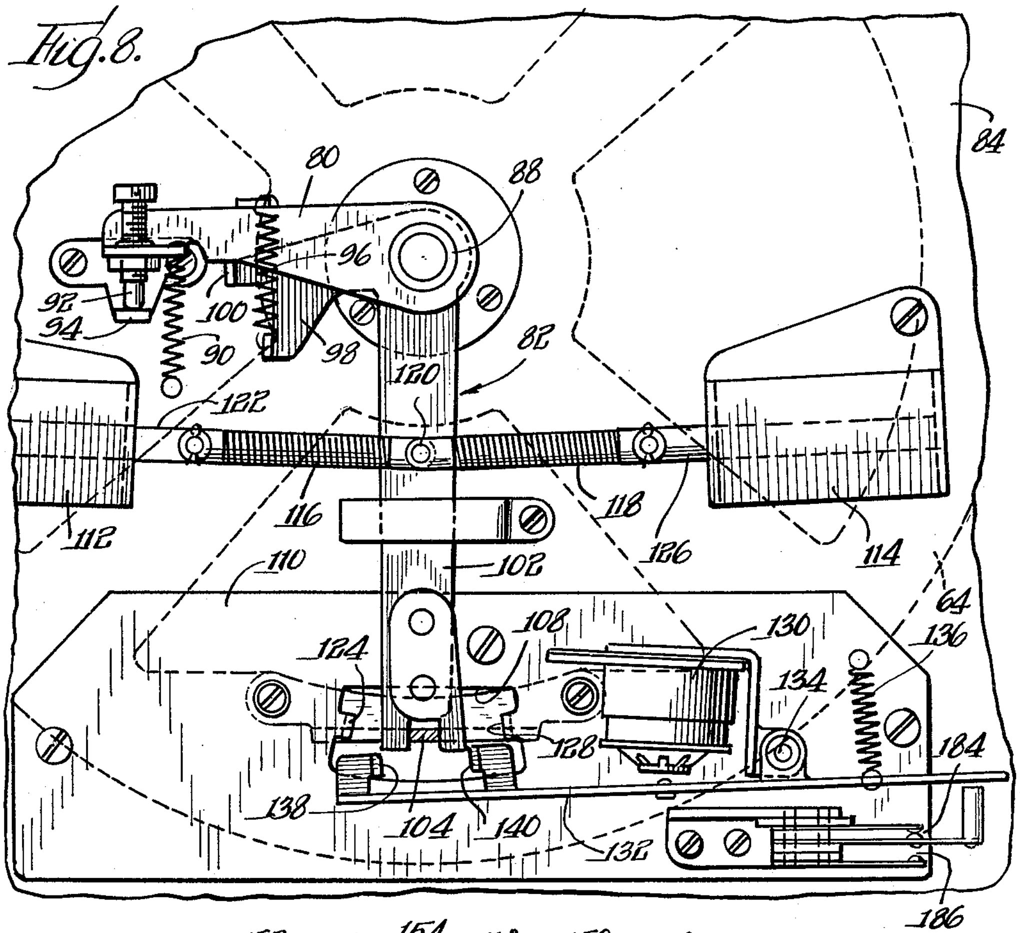
FIG. 8 is a fragmentary, horizontal sectional view taken with reference to the line 8—8 of FIG. 6.

The other centering arm or lever 82 is more accurately described as a bell-crank. A tension spring 96, connected between the arm 80 and a leg 98 of the bell-crank 82, urges the bell-crank in a clockwise direction with reference to FIG. 8 and with respect to the arm 80. Thus, the direction in which the centering element 82 is urged by the spring 96 with respect to the element 80 is opposite from the direction in which the arm 80 is urged by the spring 90. Clockwise swinging movement of the centering element 82 with respect to the element 80 is limited by engagement of an abutment 100 on the leg 98 with the arm 80, as shown in FIG. 8.

Thus, engagement of the abutment 100 with the arm 80 and engagement of the abutment 92 with the stop 94 determines the normal position of the bell-crank 82.

Figure 9:
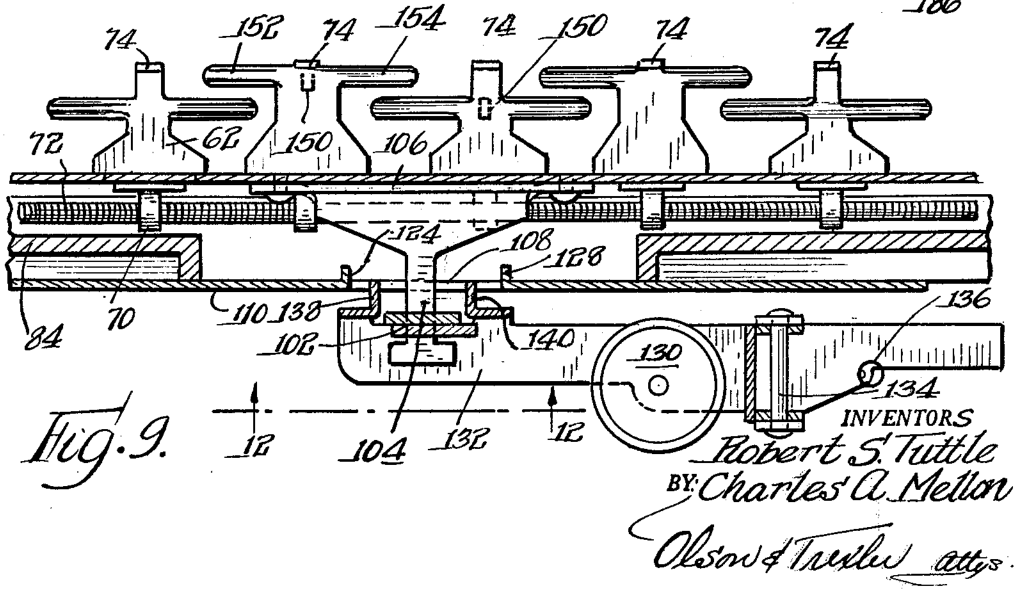
FIG. 9 is a fragmentary, vertical sectional view on an enlarged scale taken with reference to the line 9—9 of FIG. 7.

A second and longer leg 102 of the bell-crank 82 defines a bifurcaated outer end which embraces a vertical carrier positioning tang 104 projecting downwardly from a bracket 106 fixed to the underside of the carrier 64, as shown in FIG. 9. In reaching the radially outer end of the centering arm 102 the tang 104 extends down through an opening 108 in a stop plate 110 mounted in underlying relation to the support plate 84, as shown in FIGS. 8, 9, and 12 to 16.

The centering arm 102 is shifted rotatably to opposite sides of its middle position by two short stroke solenoids 112, 114 mounUted on the underside of the support plate 84 on opposite sides of the arm 102 and connected through two "solid" coiled springs 116, 118 to a common connection 120 with the arm 102. Preferably, the connection 120 of the springs 116, 118 to the arm 102 is located closer to the arm 88 than to the tang 104 so that the arcuate movement of the connection 120 is less than half that of the tang.

Energization of the solenoid 112 pulls in the solenoid plunger 122, FIG. 8, and operates through the spring 116 to swing both centering elements 80 and 82 in the clockwise direction, as viewed from the underside, against the spring 90. This effects a corresponding rotary shifting movement of the carrier 64 and all the rockers 62 on the carrier.

The maximum rotation of the carrier 64 away from its centered position by the solenoid 112 is limited by engagement of the tang 104 with a stop 124 formed by the stop plate 110 at one end of the opening 108. Engagement of the stop 124 with the tang 104 locates the carrier 64 in one extreme selecting position.

Similarly, energization of the solenoid 114 pulls in the solenoid plunger 126 and operates through the spring 118 to rotate the carrier 64 in the opposite direction from its center position until the tang 104 engages a second stop 128 on the stop plate 110 to determine a second extreme selecting position of the carrier.

Shifting of the carrier to two intermediate selecting positions intervening between the central position and the two extreme selecting positions of the carrier is effected by energization of a stop solenoid 130 in conjunction with selective energization of the shifting solenoids 112, 114.

Energization of the stop solenoid 130 swings a stop lever 132 about a pivot 134 against a spring 136 from an inoperative position, illustrated in FIGS. 8 and 12, to an operative position, illustrated in FIG. 14. A free end of the lever 132 carries two spaced stops 138, 140 which are normally disposed outside of the path of the tang 104. However, energization of the stop solenoid 130 swing the two stops 138, 140 into embracing spaced relation to the tang 104, as shown in FIG. 14. Thus, energization of the respective solenoids 112, 114 when the stop solenoid 130 is energized swings the tang 104 into engagement with the respective stops 138, 140 to locate the carrier 64 in its two intermediate positions respectively on opposite sides of its center position.

Having reference to FIGS. 13, 15 and 17, location of the centering lever 102 in its normal position, shown in FIG. 16, brings the pin setting tab 74 of a typical rocker 62 into opposing alinement with a coacting pin **34*a*. Energization of the stop solenoid 130 and the shifting solenoid 112 shifts the tang 104 to the intermediate position illustrated in FIG. 14 and brings the rocker tab 74 into alinement with a coacting selector pin 34*b*. Similarly, energization of the stop solenoid 130 and the shifting solenoid 114 would move the tab 74 of each rocker 62 into coacting alinement with the selector pin 34*c***.

Energization of the shifting solenoid 112 with the stop solenoid 130 deenergized swings the tang 104 to an extreme position illustrated in FIG. 12, to bring the typical tab 74 into alinement with a selector pin **34*d*, as shown in FIG. 13. Energization of the solenoid 114 with the solenoid 130 deenergized brings the tab 74 into alinement with a fifth selector pin 34*e***.

Means are provided for maintaining a continuing coacting relationship between each rocker 62 and the plunger 150 of its coacting pin setting solenoid 60. Thus, as shown in FIGS. 9 and 17, two arcuate wings 152, 154 are formed on each rocker 62 and extend horizontally in opposite directions in vertical alinement with the coacting solenoid plunger 150. Shifting of the carrier 64 to opposite sides of its center position brings the respective wings 152, 154 of each rocker 62 into alinement with the coacting solenoid plunger 150. Hence, for all five positions of the carrier 64, each solenoid 60 is effective to tip the coacting rocker 62 radially inward to cause the tab 74 to set the selector pin 34 alined with the tab.

Indexing of the carrier 64 and operation of the solenoids 60 selectively to set the pins 34 under the control of the selector buttons 54 and 56 will be explained with reference to the simplified electrical diagram shown in FIG. 18.

Thus, as illustrated, the number buttons 54 operate switches 160 to connect a power conductor 162 with the respective number solenoids 60. The buttons 54 are mechanically interrelated with each other in a conventional manner such that only one button can be operated at a time to effect closing of only one of the switches 160 at a time. A master control switch 164 connected to all the solenoids 60 coordinates selective energization of the solenoids 60 with coin control mechanism and other circuitry in a well known manner to effect a proper timing of energization of the solenoid 60 corresponding to the depressed number button 54.

It is functionally necessary to provide only five letter buttons 56 which operate five carrier indexing control switches 166, 168, 170, 172 and 174, illustrated in FIG. 18. If desired, the five letter buttons 56 can be duplicated with a corresponding duplication of the switches 166 through 174, to provide ten letter buttons on the control panel 57.

The five switches 166, 168, 170, 172 and 174 correspond to the five respective index or selecting positions of the carrier 64. Thus, closure of the switch 166 serves to shift the carrier 64 from its mid-position to one extreme indexed position. Thus, closure of the switch 166 connects a power conductor 178 to a conductor 180 leading to one side of the shifting solenoid 112, the other side of which is grounded through a conductor 182. This energizes the shifting solenoid 112 to shift the carrier 64 to one extreme position, as described. This follows from the fact that the switch 166 energizes the solenoid 112 without energizing the stop solenoid 130. In this connection, it is fitting to explain, with reference to FIGS. 8 and 18, that the stop lever 132, upon energization of the stop solenoid 130, operates to open a normally closed switch 184 and to close a normally open switch 186. The conductor 180 energized through the switch 166 connects through a normally closed relay switch 188—1 with the normally open switch 186 and has no effect on energizing the stop solenoid 130 upon closure of the switch 166.

Hence, closure of the letter switch 166 conditions the solenoids 60 for setting one series of twenty selector pins 34 selectively in accordance with operation of the number switches 160.

Closure of the switch 174 supplies power through a conductor 190 to a normally open relay switch 188—2 and to the shifting solenoid 114 to shift the carrier 64 to its other extreme position for effecting selective setting of another series of twenty selector pins 34.

The central switch 170, corresponding to the normal position of the carrier 64 does not operate to effect shifting of the carrier and may for present purposes be regarded as a blank switch.

Closure of the switch 168 energizes the stop solenoid 130 through a circuit including a conductor 192 (energized by the switch 168), the solenoid 130, the previously mentioned normally closed switch 184, a resistor 194 and grounded conductor 182. The solenoid 130 swings the stops 138, 140 into interfering relation with the tang 104, as described, and opens the switch 184 through which the stop solenoid 130 is initially energized.

However, the movement of the stop arm 132 which opens the switch 184 also closes the switch 186 to continue energization of the stop solenoid 130 through the switch 186, normally closed relay switch 188—1, conductor 180, shifting relay 112 and grounded conductor 182. Hence, closure of the switch 186 also serves to effect energization of the shifting solenoid 112 after the stops 138, 140 are moved into interfering relation to the tang 104 to locate the carrier 64 in a shifted intermediate position for setting another series of selector pins selectively, as described.

Closure of the switch 172 applies power to a conductor 198 which energizes the relay 188 to close relay switch 188—3, which then energizes the conductor 192 to initially energize the stop solenoid 130 in the manner described. Opening of the switch 184 and closure of the switch 186 by the stop solenoid 130 continues energization of the solenoid 130 through closed relay switch 188—2, conductor 190 and shifting solenoid 114, which is energized to shift the carrier 64 to the desired intermediate shifted position for setting another series of selector pins 34 selectively.

The selector pin setting structure just described is well suited to be controlled by a remotely controlled accessory having a new and improved construction coacting with special structure within the phonograph 20 to provide for extremely convenient optional mounting of the remotely controlled structure in association with the phonograph structure in a manner which affords ready accessibility to internal components of the assembly. Thus, as illustrated in FIGS. 2, 3 and 6, a rectilinear skirt formed by four sidewalls 200, 202, 204 and 208 extends downwardly from the support plate 84 for the previously described pin setting structure. The lower edges of the four skirt walls are horizontal and substantially flush with each other, except for the front wall 204 which extends only part way toward the lower edge of the skirt.

A remotely controlled stepping assembly 210, having a conventional design adapted to control the previously mentioned switches 160 and 166 through 174, is mounted, as shown in FIGS. 2 and 3, on an L-shaped hinge plate 212 adapted to cover the bottom of the skirt formed by the walls 200 to 208 and extend upwardly into adjoining relation to the lower edge of the front wall 204 to form a closed compartment for the control structure.

Figure 4:
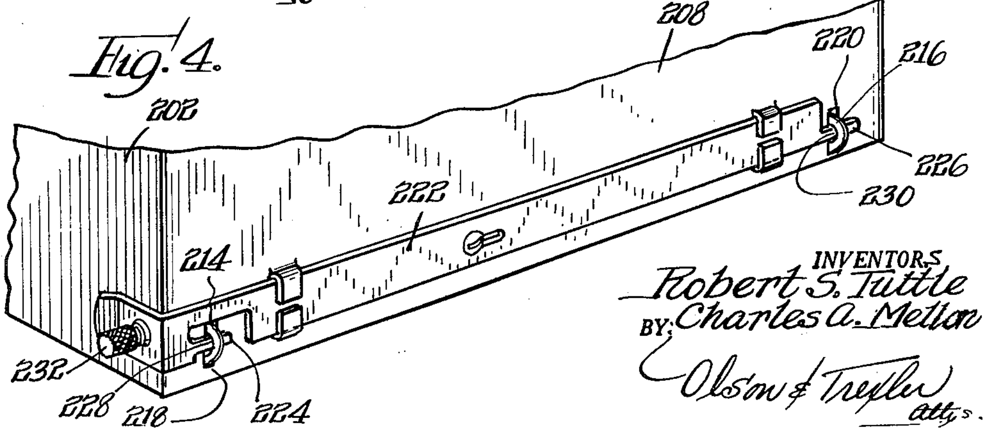
FIG. 4 is an enlarged fragmentary elevational view taken with reference to the line 4—4 of FIG. 2.

Two hinge brackets 214, 216 secured to the rear marginal edge of the hinge plate 212, as shown in FIGS. 2 and 3, extend upwardly and rearwardly through the lower end of the skirt to project outwardly through slots 218, 220 in the lower edge of the rear wall 208, as shown in FIG. 4.

A slide bar 222 slidably mounted in a horizontal position on the lower marginal edge of the wall 208, as shown in FIG. 4, defines two hinge tines or pintles 224, 226, which normally fit into apertures 228, 230 in the projecting ends of the hinge brackets 114, 116, to hold the brackets in hinged relation to the wall 208 and provide pivots for the hinges thus formed.

The slidable hinge bar 222 is held in its normal position by a knurled screw 232. Removal of the screw 232 allows the bar 222 to be moved endwise to release the hinge brackets 214, 216 for removal of the hinge plate 212 or, as more commonly the case, to provide clearance for insertion of the hinge brackets through the wall slots 218, 220, whereupon the bar 222 is returned to its normal position to retain the brackets in hinged position.

When hinged to the rear wall 208, the hinge plate 212 can be swung downwardly to an open position, shown in FIG. 2, to provide access to internal control components. Downward movement of the hinge plate is limited by scissoring links 240, 242 connected between a pivot 244 on the skirt wall 202 and a pivot lug 246 on the plate 212. A key-hole slot 248 in the link 242 provides for disengagement of the link 242 from the pivot 246, to effect easy asesmbly and disassembly of the hinge plate and the remotely controlled structure 210 in relation to the coacting overlying control structure.

When swung upwardly into its horizontal or closed position, illustrated in phantom in FIG. 2, the hinge plate 212 is supported at its front end by two resilient cantilever straps 250, 252 carrying at their upper distal ends two releasable catch elements 254, 256 adapted to snap into coacting detent apertures 257, 258 in the lower edge of the front wall 204 as the hinge plate reaches its normal position. While the spring force of the cantilevers 252, 250 is sufficient to hold the catches 254, 256 in place, it is preferred that knurled screws 260 be applied to more positively hold the catches in engaged position.

Thus, mounting of the hinge plate 212 which serves as a support for the remotely controlled structure 210 is a very simple matter. It consists essentially of operation of the slide bar 222 to lock the hinge brackets 214, 216 in place, fitting the limit pivot 246 into the key-hole slot 248 of the hinge 242 and swinging of the hinge plate into a horizontal position, whereupon the catches 254, 256 automatically retain the hinge plate in a horizontal position.

A vertical leg 262 integral with the front edge of the hinge plate 212 complements the front wall 204 to close the front side of the depending skirt.

It will be appreciated that the invention is not necessarily limited to the use of the specific construction illustrated and described, but includes variants and alternatives within the spirit and scope of the invention as defined by the claims.

The invention is claimed as follows:

1. In an automatic phonograph, record selecting means comprising, in combination, an annular array of selector pins, an annular series of pin setting solenoids, rotary selector means having a plurality of rotatably spaced operating positions corresponding respectively to a plurality of different annular series of said selector pins, said selector means including means coacting with said solenoids in each of said operating positions of said selector means to effect an operative pin setting relationship between said solenoids and a corresponding series of said pins, means for urging said selector means to a middle one of said operating positions thereof, two shifting solenoids connected to said selector means for moving the latter rotatably in opposite directions from said middle position, a pair of abutments coacting with said selector means to terminate movement thereof by said shifting solenoids in either of two extreme ones of said operating positions thereof, a pair of movable stops, a stop solenoid coacting with said movable stops to move the latter between inoperative positions and operative positions in which the movable stops limit movement of said selector means by said shifting solenoids to either of two intermediate ones of said operating positions thereof, switching means for energizing said stop solenoid and said shifting solenoids selectively to locate said selector means in any one of four operating positions located on opposite sides of said middle position, and switch means for energizing said pin setting solenoids selectively when said selector means is in any one of said operating positions thereof.

2. In an automatic phonograph, five different annular series of settable selector pins disposed in a common annular array, means for playing a plurality of records selectively in accordance with the setting of said pins, an annular series of pin setting solenoids corresponding in number to the number of selector pins in each of said series, rotary selector means having five rotatably spaced operating positions corresponding to the respective series of selector pins, said selector means including means coacting with said solenoids in each of said operating positions of said selector means to effect an operative pin setting relationship between said solenoids and the corresponding series of selector pins, spring means coacting with said selector means to urge the latter to the middle one of said operating positions thereof, two shifting solenoids connected with said selector means to shift the latter rotatably in opposite directions from said middle position thereof, abutment means coacting with said selector means to terminate movement thereof by said respective shifting solenoids in two extreme ones of said operating positions located on opposite sides of said middle position, a stop solenoid, stop means connected to said stop solenoid for movement thereby from an inoperative position to an operative position wherein the stop means terminates movement of said selector means by said respective shifting solenoids in two intermediate ones of said operating positions between said middle positions and said extreme positions, and switching means for controlling said stop solenoid and said shifting solenoids selectively to locate said selector means in said operating positions thereof selectively.

3. In an automatic phonograph, record selecting means comprising, in combination, an annular array of selector pins, an annular series of pin setting solenoids, rotary selector means having a plurality of rotatably spaced operating positions corresponding respectively to a plurality of different annular series of said selector pins, said selector means including means coacting with said solenoids in each of said operating positions of said selector means to effect an operative pin setting relationship between said solenoids and a corresponding series of said pins, means for urging said selector means to a middle one of said operating positions thereof, two shifting solenoids connected to said selector means for moving the latter rotatably in opposite directions from said middle position to two extreme operating positions located on opposite sides of said middle position, a pair of stops movable between inoperative positions thereof and operative positions thereof in which the stops terminate movement of said selector means by said respective shifting solenoids to two intermediate operating positions located on opposite sides of said middle position, a stop solenoid for moving said stops between said inoperative and operative positions thereof, switching means for energizing said stop solenoid and said shifting solenoids selectively to locate said selecting means in any one of four operating positions located on opposite sides of said middle position, and switch means for energizing said pin setting solenoids selectively when said selector means is in any one of said operating positions thereof.

4. In an automatic phonograph, a plurality of different series of settable selector elements disposed in a common array, means for playing a plurality of records selectively in accordance with the setting of said selector elements, a series of selector element setting solenoids corresponding in number to the number of selector elements in each series, shiftable selector means having spaced operating positions corresponding to the respective series of selector element, said selector means coacting with said solenoids in each of said operating positions of said selector means to effect an operative pin setting relationship between said solenoids and the corresponding series of selector elements, means for locating said selector means in the middle one of said operating positions thereof, two shifting solenoids connected with said selector means to shift the latter in opposite directions to extreme operating positions located on opposite sides of said middle position, a stop solenoid, stop means operated by said stop solenoid for movement between an inoperative position and an operative position wherein the stop means terminates movement of said selector means by said respective shifting solenoids in two intermediate operating positions located on opposite sides of said middle position, and switching means for controlling said stop solenoid and said shifting solenoids selectively to locate said selector means in said operating positions thereof selectively.

5. In an automatic phonograph, a plurality of annular series of settable selector pins disposed in a common annular array, means for playing a plurality of records selectively in accordance with the setting of said pins, an annular series of pin setting solenoids corresponding in number to the number of selector pins in each series, rotary selector means having rotatably spaced operating positions corresponding to the respective series of selector pins, said selector means including means coacting with said solenoids in each of said operating positions of said selector means to effect an operative pin setting relationship between said solenoids and the corresponding series of selector pins, means for locating said selector means in the middle one of said operating positions thereof, two shifting solenoids connected with said selector means to shift the latter rotatably in opposite directions to operating positions located on opposite sides of said middle position, switch means for energizing said shifting solenoids selectively, and switch means for energizing said pin setting solenoids selectively when said selector means is in any of said operating positions thereof.

6. In an automatic phonograph, the combination of an annular array of settable selector elements, an annular series of selector element setting solenoids, a rotatable transmission element carrier having five rotatably spaced operating positions a transmission element for each of said solenoids mounted on said carrier and having a coacting alignment with the corresponding solenoid when said carrier is in each of said five positions thereof, each transmission element including means thereon which is disposed in operative pin setting alignment with five different selector pins when said carrier is located in the respective ones of said five operating positions thereof, first and second centering elements for normally locating said carrier in the middle one of said operating positions thereof, spring means connected between said first and second centering elements to urge said first centering element rotatably in a first direction relative to said second centering element, coacting abutment means on said first and second centering elements for terminating movement of said first centering element relative to said second centering element in said one direction in a predetermined normal position, spring means connected to said second centering element to urge the latter rotatably in a second direction opposite from said first direction, adjustable abutment means for terminating rotation of said second centering element in said second direction in a normal position corresponding to the middle operating position of said carrier, means connecting said first centering element to said carrier to rotate the latter, two shifting solenoids connected to said first centering element to move the latter in opposite directions from the normal position thereof to two extreme positions located on opposite sides of said middle position thereof, stop means movable between an inoperative position and an operative position which stops movement of said carrier by said respective shifting solenoids in two intermediate operating positions located on opposite sides of said middle operating position, a stop solenoid coacting with said stop means to move the latter between said inoperative and operative positions thereof, and selector switch means for controlling and coordinating said shifting solenoids and said stop solenoid to locate said carrier selectively in any of said positions thereof.

7. In an automatic phonograph, the combination of an annular array of settable selector elements, means for playing records selectively in accordance with the setting of said selector elements, an annular series of selector element setting solenoids, a rotatable transmission element carrier having a plurality of rotatably spaced operating positions, a transmission element for each of said solenoids mounted on said carrier and having a coacting alignment with the corresponding solenoid when said carrier is in each of said positions thereof, each transmission element including means thereon which is disposed in operative pin setting alignment with different selector pins when said carrier is located in the respective ones of said operating positions thereof, first and second centering elements for normally locating said carrier in a normal one of said operating positions thereof, spring means connected between said first and second centering elements to urge said first centering element rotatably in a first direction relative to said second centering element, coacting abutment means on said first and second centering elements for terminating movement of said first centering element relative to said second centering element in said one direction in a predetermined normal position, spring means connected to said second centering element to urge the latter rotatably in a second direction opposite from said first direction, abutment means for terminating rotation of said second centering element in said second direction in a normal position corresponding to a normal operating position of said carrier, means connecting said first centering element to said carrier to rotate the latter, and two shifting solenoids connected to said first centering element to move the latter in opposite directions from the normal position thereof to positions located on opposite sides of said normal position.

8. In an automatic phonograph, the combination of an annular array of settable selector elements, means for playing records selectively in accordance with the setting of said selector elements, rotary selector means having a plurality of rotatably spaced operating positions, said selector means including means for setting said selector elements selectively in accordance with the rotary position of said selector means, first and second centering elements for normally locating said selector means in a normal one of said operating positions thereof, spring means connected between said first and second centering elements to urge said first centering element rotatably in a first direction relative to said second centering element, coacting abutment means on said first and second centering elements for terminating movement of said first centering element relative to said second centering element in said one direction in a predetermined normal position, spring means connected to said second centering element to urge the latter rotatably in a second direction opposite from said first direction, means for terminating rotation of said second centering element in said second direction in a normal position corresponding to a normal operating position of said selector means, said first centering element being connected to said selector means to rotate the latter, shifting means connected to said first centering element to move the latter in opposite directions from the normal position to two extreme positions located on opposite sides of said normal position thereof, stop means movable between an inoperative position and an operative position which stops movement of said selector means by said shifting means in two intermediate positions located on opposite sides of the normal position thereof, and means for moving said stop means between said positions thereof.

9. In an automatic phonograph, the combination of an annular array of settable selector pins, means for playing a plurality of records selectively in accordance with the setting of said pins, an annular series of selector pin setting solenoids substantially concentric with said series of pins, a carrier mounted for rotation in generally concentric relation to said series of pins and having a plurality of rotatably spaced operating positions, a transmission element for each of said solenoids mounted on said carrier and having a coacting alignment with the corresponding solenoid when said carrier is in each of said positions thereof, each transmission element including means thereon which is disposed in operative pin setting alignment with different ones of said selector pins when said carrier is located in the respective positions thereof, means for normally locating said carrier in a middle one of said positions thereof, two shifting solenoids connected to said carrier for moving the latter rotatably in opposite directions to extreme positions thereof located on opposite sides of said middle position thereof, solenoid operated stop means coacting with said carrier and being selectively operable to terminate rotary movement of said carrier by said shifting solenoids in intermediate positions located on opposite sides of said middle position, generally rectangular skirt means extending downwardly from said series of pin setting solenoids, a normally horizontal hinge plate disposed in closing relation to the lower end of said skirt, separable hinge means hingedly connecting said hinge plate at one edge thereof to one side of said skirt to provide for swinging movemnet of the hinge plate between a generally horizontal normal position and a downwardly extending open position and providing for convenient disconnection of said hinge plate from said skirt, remote control structure mounted on the upper side of said hinge plate to be supported by the latter within said skirt when said hinge plate is in its normal position, means for connecting said remote control structure to operate said solenoids and said solenoid operated stop means, and two spring catch straps mounted on said hinge plate in remote relation to said hinge means and cantilevering from said hinge plate to coact with said skirt to releasably hold said hinge plate in the normal position thereof.

10. In an automatic phonograph, the combination of an annular array of settable selector elements, means for playing records selectively in accordance with the setting of said selector elements, rotary selector means having a plurality of rotatably spaced operating positions, said selector means including means for setting said selector elements selectively in accordance with the rotary position of said selector means, means for normally locating said selector means in a central one of said operating positions thereof, two shifting solenoids coacting with said selector means to shift the latter in opposite directions to two extreme operating positions located on opposite sides of said central position, solenoid operated stop means coacting with said selector means and coordinated with said shifting solenoids to terminate shifting movement of said selector means by said solenoids in two intermediate operating positions located on opposite sides of said central positions, a rectilinear skirt extending downwardly from said selector means, remote control structure for operating said selector means, said shifting solenoids and said solenoid operated stop means; a hinge plate supporting said remote control means on the upper side of the plate, two hinge brackets on said hinge plate, a hinge pintle slide on one lower edge of said skirt coacting with said hinge brackets to detachably secure said plate in hinged relation to said skirt for swinging movement between a generally horizontal closed position which supports said remote control structure within said skirt and a downwardly extending open position which provides excess to said remote control structure, and resilient latch straps fixed to the forward end of said hinge plate and cantilevering upwardly therefrom to coact with said skirt to releasably hold said hinge plate in said closed position thereof.

References Cited in the file of this patent

UNITED STATES PATENTS

| | | |
|---|---|---|
| 2,282,384 | Schenck | May 12, 1942 |
| 2,949,309 | Riggs | Aug. 16, 1960 |